(12) United States Patent
Chen

(10) Patent No.: US 10,802,378 B2
(45) Date of Patent: Oct. 13, 2020

(54) MECHANISM AND SYSTEM FOR ATTACHING AN EXTERNAL FLASH TO A CAMERA, AND A FLASH

(71) Applicant: Qingyuan Chen, Leqing (CN)

(72) Inventor: Qingyuan Chen, Leqing (CN)

( * ) Notice: Subject to any disclaimer, the term of this patent is extended or adjusted under 35 U.S.C. 154(b) by 0 days.

(21) Appl. No.: 14/446,526

(22) Filed: Jul. 30, 2014

(65) Prior Publication Data
US 2015/0153631 A1 Jun. 4, 2015

(30) Foreign Application Priority Data

Nov. 30, 2013 (CN) .......................... 2013 1 0634749

(51) Int. Cl.
*G03B 15/05* (2006.01)

(52) U.S. Cl.
CPC ........ *G03B 15/05* (2013.01); *G03B 2215/056* (2013.01)

(58) Field of Classification Search
CPC ................................................. G03B 15/0421
See application file for complete search history.

(56) References Cited

U.S. PATENT DOCUMENTS

| 5,895,128 A * | 4/1999 | Kishimoto | G03B 15/05 396/182 |
| 5,956,531 A * | 9/1999 | Kawabe | G03B 15/05 396/175 |
| 8,150,256 B2 * | 4/2012 | Nagashiro | G03B 17/38 348/211.2 |
| 2012/0170782 A1 * | 7/2012 | Ettinger | H04R 1/02 381/332 |

FOREIGN PATENT DOCUMENTS

JP  2009180878 A  *  8/2009  ............. G03B 15/03

OTHER PUBLICATIONS

TheFamilyguy421. "Canon Speedlite 600EX-RT Review—Hands on Review—Features of the Flash Body." YouTube. Published May 5, 2012. Accessed May 25, 2017. https://www.youtube.com/watch?v=elGu-8poJls.*

* cited by examiner

*Primary Examiner* — Noam Reisner

(57) ABSTRACT

The present invention relates to a mechanism and system for attaching an external flash to a camera, and a flash. The connection mechanism comprises: a body, a connecting foot and at least two groups of electrical contacts for touching contacts of hot shoes of at least two differing types of cameras for connecting an external flash control unit; when a flash provided with the mechanism for attaching an external flash to a camera as disclosed in the present invention is mounted on a camera, the corresponding group of electrical contacts touch each other to transmit signals. Since at least two groups of electrical contacts are provided, the flash is capable of being applied to cameras of two differing types, and further facilitating users and saving costs.

9 Claims, 3 Drawing Sheets

MECHANISM AND SYSTEM FOR ATTACHING AN EXTERNAL FLASH TO A CAMERA, AND A FLASH

FIELD OF THE INVENTION

The present invention relates to the technical field of light fittings for photography and videography, and in particular to a mechanism and system for attaching an external flash to a camera.

BACKGROUND

A flash capable of emitting strong light in a short time is a lamp commonly used in photography and videography. It is frequently used for instant lighting under low light conditions and also for adding a fill light for a part of a subject under bright light conditions. It is small, safe to use, easy to carry and stable in performance. Generally speaking, flashes comprise built-in flashes and external flashes which are generally positioned on the top of the camera body and attached to cameras via a hot shoe connector.

However, different types of cameras have different hot shoe connectors, mainly in the locations of electrical contacts of the hot shoe connectors and signals transmitted as well. These differences render external flashes of differing types incapable of replacing each other. For manufacturers making flashes, they have to make flashes corresponding to cameras of differing types. It not only causes inconveniences for users, but also increases costs.

SUMMARY OF THE DISCLOSURE

One technical problem the present invention intends to solve is differing types of external flashes incapable of generally replacing each other due to the difference between hot shoe connectors of cameras of different types, in particular the difference between locations of electrical contacts of the hot shoe connectors and signals transmitted as well. For manufacturers making flashes, they have to make flashes corresponding to cameras of differing types. It not only causes inconveniences for users, but also increases cost. Therefore, a mechanism and system capable of attaching an external flash to various types of cameras as well as a flash capable of being applied to various types of cameras are provided herein.

In order to solve the above technical problem, the present invention is realized via the following technical solution:

A mechanism for attaching an external flash to a camera, comprising:
  a body,
  a connecting foot, a rectangular metal sheet fixedly mounted on the body and exposing the body in the middle for grounding;
  at least two groups of electrical contacts, fixedly mounted on the body exposed in the middle of the connecting foot, wherein said at least two groups of electrical contacts are configured to touch contacts on hot shoes of at least two differing types of cameras for connecting an external flash control unit.

Comprising two groups of electrical contacts, wherein a first group of said two groups of electrical contacts is configured to touch corresponding electrical contacts at hot shoe connectors of cameras of a first type, and a second group of said two groups of electrical contacts is configured to touch corresponding electrical contacts at hot shoe connectors of cameras of a second type.

The first group of electrical contacts specifically comprises a shared trigger foot, a flash data output foot, a first clock foot, a flash signal detection foot, a camera data input foot; wherein, the shared trigger foot is mounted in the middle of the body exposed in the middle of the connecting foot, the flash data output foot is mounted in the lower left side of the shared trigger foot, the first clock foot is mounted in the right side of the shared trigger foot and is symmetric to the flash data output foot, the flash signal detection foot is mounted right beneath the flash data detection foot, and the camera data input foot is mounted right beneath the first clock foot.

The second group of electrical contacts specifically comprises a shared trigger foot, a second clock foot, an input and output data foot and a chip select foot, wherein in a plane view, the second clock foot is mounted in the lower right side of the shared trigger foot without overlapping with the first clock foot and the camera input foot, the input and output data foot is mounted in the lower left side of the shared trigger foot and is symmetric to the second clock foot, and the chip select foot is mounted in the upper left side of the shared trigger foot.

Based on the same inventive concept, the present invention also provides a connection system comprising the mechanism for attaching an external flash to a camera, comprising A main control unit connected to the mechanism for attaching an external flash to a camera, wherein the main control unit is configured to, according to signals transmitted from a first group of electrical contacts of the mechanism for attaching a flash to a camera, determine the type of cameras corresponding to the group of electrical contacts and then select a flash control program corresponding to that type of camera to send control command to an external flash.

The main control unit is connected respectively to an infrared sensor signal processing circuit, a keyboard input circuit, a stepper motor, a switch, an intelligent boost converter circuit having a first end and a second end; a power circuit connected to said intelligent boost converter circuit, wherein said power circuit is connected to said first end of said battery and the power circuit is also connected to said first end of said battery and said first end of said the intelligent boost converter circuit is connected to said second end of said battery; a rectifier filter circuit having a first end and a second end, wherein said first end of said rectifier filter circuit is connected to said second end of said intelligent boost converter circuit and said second end of said rectifier filter circuit is connected to one end of the switch. Meanwhile, one end of the switch is also connected to an energy-storing capacitor. The switch electrifies the main control unit when in said first position, and said switch electrifies the flash tube in said second position, wherein the flash tube is also connected to the stepper motor.

The main control unit is also connected to a display circuit and a wireless input module respectively.

Said display circuit is a LCD display circuit.

A flash, comprising the connection system for attaching an external flash to a camera.

Compared with the prior art, the above technical solution of the present invention has the following advantages:

(1) The mechanism for attaching an external flash to a camera according to the present invention, comprises: a body, a connecting foot and at least two groups of electrical contacts; the at least two groups of electrical contacts touch contacts of hot shoes of at least two differing types of cameras for connecting an external flash control unit; when a flash provided with the mechanism for attaching an external flash to a camera as disclosed in the present invention is mounted on a camera, the corresponding electrical contacts contact with each other to transmit signals. Since at least two groups of electrical contacts are provided, the flash is capable of being applied to cameras of at least two types, which will further facilitate users and also save costs; since there are also situations where electrical contacts of cameras of different types have the same location, the two groups of electrical contacts provided in the present invention also have some shared electrical contacts, and thus space is saved.

(2) The connection system comprising the mechanism for attaching an external flash to a camera provided in the present invention, the mechanism for attaching an external flash to a camera is connected to a main control unit, the main control unit is configured to, according to signals transmitted from a first group of electrical contacts of the mechanism for attaching a flash to a camera, determine the type of cameras corresponding to the group of electrical contacts, and further select a flash control program corresponding to cameras of that type to send corresponding control command; the present invention is capable of being applied to at least two types of cameras, and thus capable of facilitating users and saving costs.

BRIEF DESCRIPTION OF THE DRAWINGS

Hereinafter, in order to make the present invention easier to be fully understood, the present invention will now be further described with reference to the accompanying drawings in which.

Figure 1:
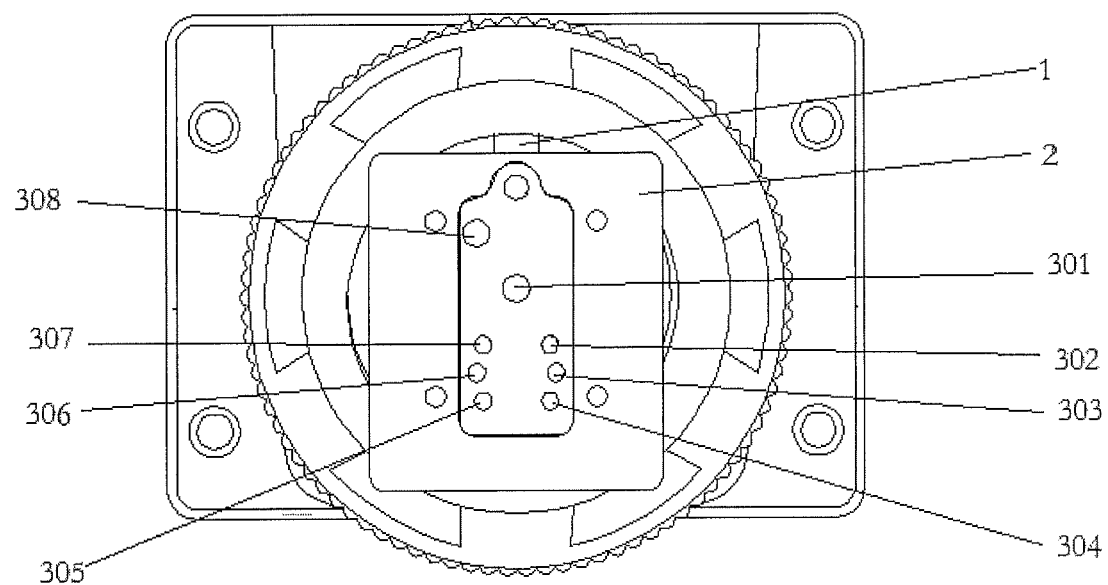
FIG. 1 is a schematic of the mechanism for attaching an external flash to a camera according to embodiment 1 of the present invention.

The reference numbers in the drawings are: 1—body, 2—connecting foot, 3—two groups of electrical contacts, 301—shared trigger foot, 302—first clock foot, 303—second clock foot, 304—camera data input foot, 305—flash signal detection foot, 306—input and output data foot, 307—camera data output foot, 308—chip select foot.

DETAILED DESCRIPTION

Embodiment 1

Figure 2:
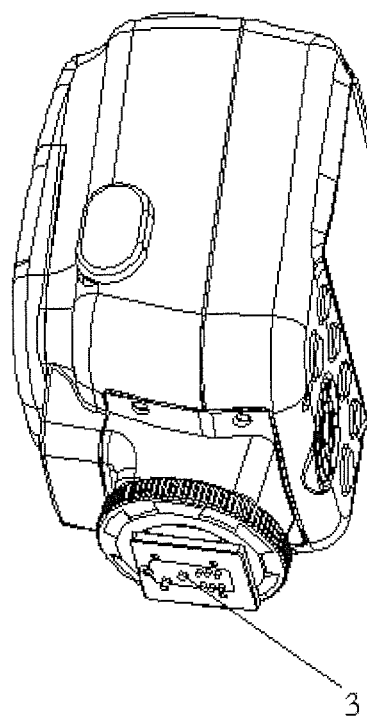
FIG. 2 is a schematic of a flash for the mechanism for attaching an external flash to a camera according to embodiment 1 of the present invention.

As shown in FIG. 1 and FIG. 2, the mechanism for attaching an external flash to a camera according to the present invention comprises:

Body 1, Connecting foot 2, a rectangular metal sheet fixedly mounted on the body and exposing the body in the middle for grounding;

At least two groups of electrical contacts 3, fixedly mounted on the body 1 exposed in the middle of the connecting foot, for touching contacts of at least two types of cameras for connecting an external flash control unit.

When a flash provided with the mechanism for attaching an external flash to a camera as disclosed in the present invention is mounted on a camera, the corresponding group of electrical contacts contact with each other to transmit signals. Since at least two groups of electrical contacts 3 are provided, the flash is capable of being applied to cameras of at least two types, which will therefore facilitate users and also save costs.

In the present embodiment, one group of the electrical contacts of the two groups of electrical contacts 3 specifically comprises share trigger foot 301, flash data output foot 307, first clock foot 302, flash signal detection foot 305, camera data input foot 304, and is also capable of matching corresponding electrical contacts of hot shoe connectors of at least one type of camera; wherein, the shared trigger foot 301 is mounted in the middle of the body 1 exposed in the middle of the connecting foot 2, the flash data output foot 307 is mounted in the lower left side of the shared trigger foot 301, the first clock foot 302 is mounted in the right side of the shared trigger foot 301 and is symmetric to the flash data output foot 307, the flash signal detection foot 305 is mounted right beneath the flash data output foot 307, and the camera data input foot 304 is mounted right beneath the first clock foot 302.

A second group of electrical contacts of the two groups of electrical contacts 3 specifically comprises shared trigger foot 301, second clock foot 303, input and output data foot 306 and chip select foot 308, and is capable of matching corresponding electrical contacts of hot shoe connectors of at least a second type of camera; wherein, the second clock foot 303 is mounted in the lower right side of the shared trigger foot 301 without overlapping the first clock foot 302 and the camera input foot 304, the input and output data foot 306 is mounted in the lower left side of the shared trigger foot 301 and is symmetric to the second clock foot 303, and the chip select foot 308 is mounted in the upper left side of the shared trigger foot 301.

The at least two groups of electrical contacts 3 are projecting structures and connected to the body exposed in the middle of the connecting foot via an elastic component. The electrical contacts on the camera lies in the same plane with its surrounding base, and thus, when the flash is attached to one type of camera, the at least two groups of electrical contacts 3 when under pressure will press against the plane of the electrical contacts of the camera via the elastic component, wherein the group of electrical contacts matching that type of camera will touch the electrical contacts of the camera to transmit signals while the rest group of electrical contacts which do not match that type of camera will not touch the electrical contacts of the camera, and thus can not transmit signals. Therefore, the present invention achieves the technical effect of applying the flash generally to cameras of differing types.

Figure 3:
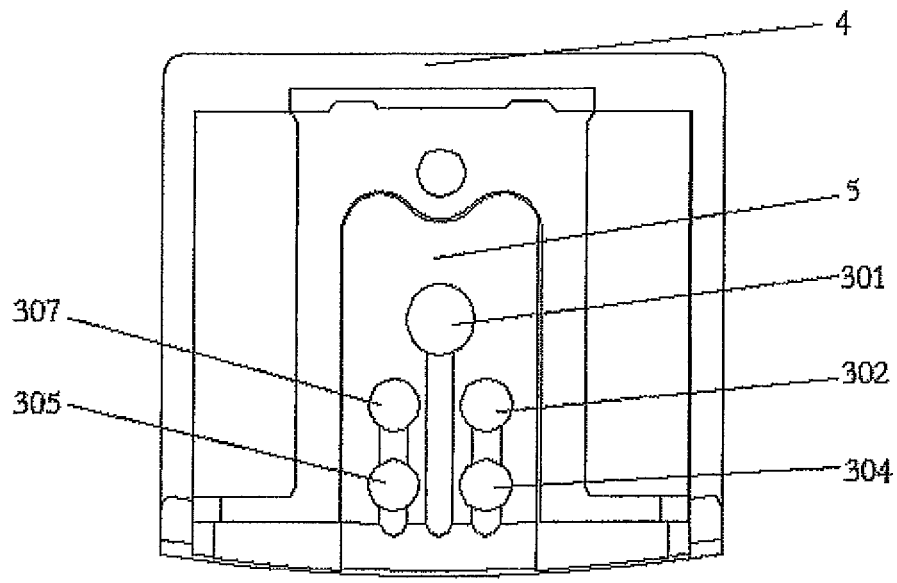
FIG. 3 is a schematic of electrical contacts of a Canon camera for mechanism for attaching an external flash according to embodiment 1 of the present invention.
Figure 4:
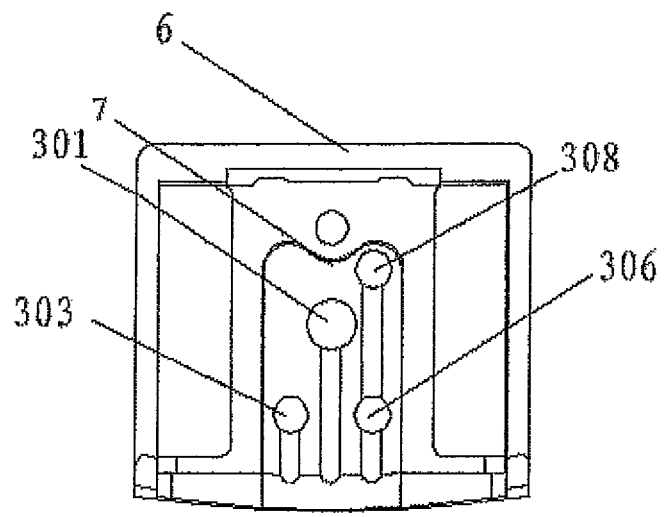
FIG. 4 is a schematic of electrical contacts of a Nikon camera for the mechanism for attaching an external flash according to embodiment 1 of the present invention.

FIG. 3 and FIG. 4 display how different types of cameras can have electrical contacts with the same location. Taking Canon and Nikon cameras as examples, hot shoe 4 and electrical contacts 5 of a Canon camera are shown in FIG. 3, and hot shoe 6 and electrical contacts 7 of a Nikon camera are shown in FIG. 4. It can be seen that locations of their electrical contacts are different, wherein the locations of the electrical contacts in the middle are the same while the locations of the others are different. Therefore, the electrical contacts having the same location can be used as a shared contact. For the present embodiment, the electrical contacts of the flash provided in the present invention comprise that of Canon and Nikon cameras, and their logical relations is "and". When the flash is connected to a camera and a shared contact is detected, the type of the camera can then be determined through detecting another electrical contact having a different location, and then a flash control program corresponding to the type of camera can be selected to send a corresponding control command.

In other embodiments of the present invention, electrical contacts of various types can be provided on the flash, electrical contacts of three types of cameras for example, wherein the electrical contacts having the same location are utilized as the shared electrical contact. When the flash is connected to a camera and a shared electrical contact is detected by the flash, the type of the camera can then be determined through detecting another electrical contact having a different location, and then a flash control program corresponding to that type of camera can be selected to send a corresponding control command.

Since cameras of differing types have some shared electrical contacts, space can thus be saved. Depending on the size of the space, a flash can be provided with multiple groups of electrical contacts so as to achieve the technical effect of applying a flash generally to various cameras with various differing types of electrical contacts and hot shoes.

Embodiment 2

Figure 5:
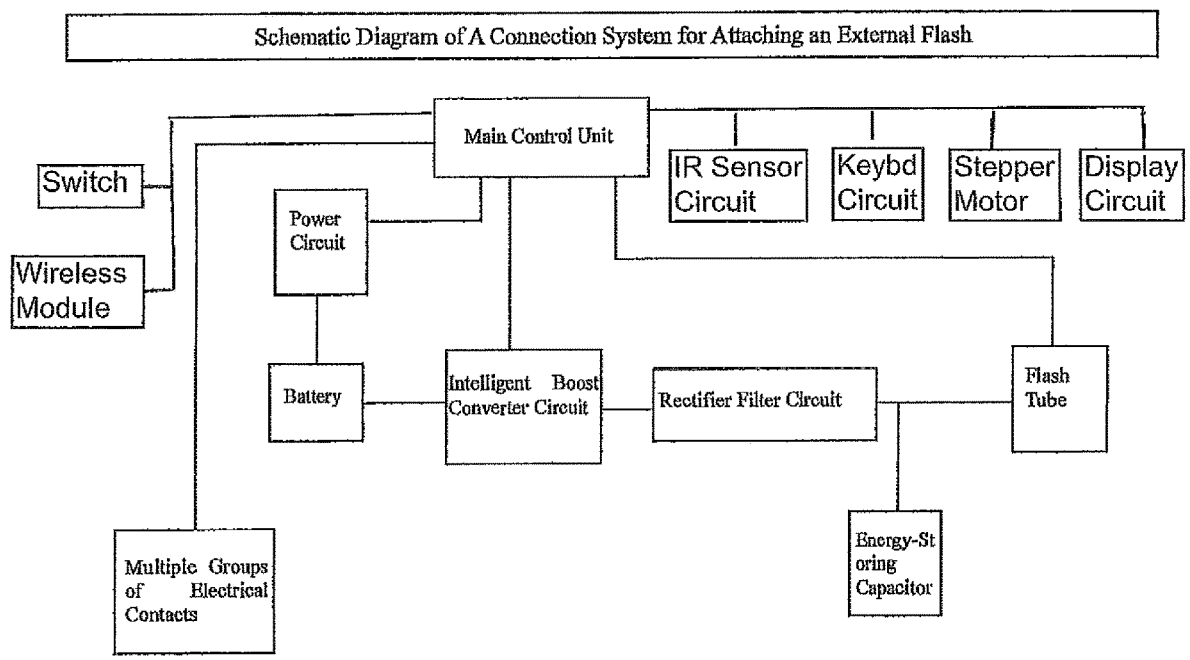
FIG. 5 is an architecture diagram of the connection system comprising the mechanism for attaching an external flash to a camera according to embodiment 2 of the present invention.

The present invention also provides a connection system comprising the mechanism for attaching an external flash to a camera, which is shown is FIG. 5.

The connection system comprises the mechanism for attaching an external flash to a camera, and a main control unit connected to the mechanism for attaching an external flash to a camera, wherein the main control unit is configured to, according to signals transmitted from one group of electrical contacts of the mechanism for attaching a flash to a camera, determine the type of the camera corresponding to the group of electrical contacts, and further select a flash control program corresponding to that type of camera to send corresponding control command to an external flash.

The camera contains a light metering device. When photographing, the camera measures the amount of light at first and transmits the data of the light to the flash control program. The flash control program then calculates the illumination value needed according to the data of the light, and the flash produces a flash according to the illumination value needed.

Capable of being applied to cameras with at least two differing types of contacts and hot shoes, the present invention can thus facilitate users and save costs as well.

In the present embodiment, the main control unit is connected respectively to an infrared sensor signal processing circuit, a keyboard input circuit, a stepper motor, a switch, a boost converter circuit and a power circuit; wherein the power circuit is also connected to one end of a battery whose another end is connected to one end of the boost converter circuit, the another end of the boost converter circuit is connected to one end of the rectifier filter circuit whose another end is connected to one end of the switch. Meanwhile, one end of the switch is also connected to an energy-storing capacitor. The boost converter can be an intelligent boost converter. The switch electrifies the main control unit at a first position, and the unit electrifies the flash tube at a second position, wherein the flash tube is also connected to the stepper motor.

In the present embodiment, the main control unit is also connected respectively to a display circuit and a wireless input module. The display circuit is LCD (abbreviation of Liquid Crystal Display) display circuit as the LCD display circuit is visual in display, and LCD display screen is lower in costs.

Apparently, the above embodiments have been disclosed only for illustrative purposes and are not to limit the mode for carrying out the invention. For person of ordinary skill in the art, other variations or modifications can be deduced based on the above disclosed description. One neither needs to nor be able to present all modes for carrying out the inventions. Any variations or modifications based on the above shall still fall within the scope of the present invention.

I claim:

1. A mechanism for attaching an external flash to a camera, comprising:
   a body,
   a connecting foot including a rectangular metal sheet fixedly mounted on the body and exposing the body in the middle;
   at least two groups of electrical contacts, fixedly mounted on the body exposed in the middle of the connecting foot, wherein said at least two groups of electrical contacts are configured to touch contacts of hot shoes of at least two differing types of cameras for connecting an external flash control unit;
   wherein said at least two groups of electrical contacts comprises two groups of electrical contacts; said two groups of electrical contacts comprises a first group of said two groups of electrical contacts and a second group of said two groups of electrical contacts;
   wherein the first group of electrical contacts comprises a first clock foot and a camera data input foot; and
   wherein the second group of electrical contacts specifically comprises a shared trigger foot, a second clock foot, an input and output data foot, and a chip select foot, wherein in a plane view, the second clock foot is mounted in the lower right side of the shared trigger foot without overlapping laterally relative to each other with the first clock foot and the camera data input foot, the input and output data foot is mounted in the lower left side of the shared trigger foot and is symmetric to the second clock foot, and the chip select foot is mounted in the upper left side of the shared trigger foot.

2. The mechanism for attaching an external flash to a camera according to claim 1, wherein the first group of said two groups of electrical contacts is configured to touch corresponding electrical contacts at hot shoe connectors of cameras of a first type, and the second group of said two groups of electrical contacts is configured to touch corresponding electrical contacts at hot shoe connectors of cameras of a second type.

3. The mechanism for attaching an external flash to a camera according to claim 2, wherein the two groups of electrical contacts comprise at least one shared electrical contact.

4. The mechanism for attaching an external flash to a camera according to claim 2, wherein; the first group of electrical contacts further comprises a shared trigger foot, a flash data output foot, and a flash signal detection foot, wherein, the shared trigger foot is mounted in the middle of the body exposed in the middle of the connecting foot, the flash data output foot is mounted in the lower left side of the shared trigger foot, the first clock foot is mounted in the right side of the shared trigger foot and is symmetric to the flash data output foot, the flash signal detection foot is mounted right beneath a flash data detection foot, the camera data input foot is mounted right beneath the first clock foot.

5. A connection system for the mechanism for attaching an external flash to a camera, comprising the mechanism for attaching an external flash to a camera according to claim 1; a main control unit connected to the mechanism for attaching an external flash to a camera, wherein the main control unit is configured to, according to signals transmitted from one group of electrical contacts of the mechanism for attaching a flash to a camera, determine the type of the camera based on which group of electrical contacts is transmitting signals, and then select a flash control program corresponding to the camera of the type to send control command to the external flash.

6. The connection system according to claim 5, further comprising:
   an boost converter circuit having a first end and a second end;
   a power circuit connected to said boost converter circuit;
   a battery with a first end and a second end, wherein said power circuit is connected to said first end of said battery and said first end of said boost converter circuit is connected to said second end of said battery;
   a rectifier filter circuit having a first end and a second end, wherein said first end of said rectifier filter circuit is connected to said second end of said boost converter circuit and said second end of said rectifier filter circuit is connected both to a flash tube and an energy-storing capacitor.

7. The connection system according to claim 6, wherein the main control unit is also connected respectively to an infrared sensor signal processing circuit, a keyboard input circuit, a stepper motor, a switch having a first position and a second position, a display circuit and a wireless input module;
   one end of the switch is connected to the rectifier filter circuit, the same end of the switch is also connected to an energy-storing capacitor; wherein the switch electrifies the main control unit when in said first position, and said switch electrifies the flash tube and the stepper motor in said second position.

8. The connection system according to claim 7, wherein said display circuit is an LCD display circuit.

9. A flash comprising the connection system for attaching an external flash to a camera according to claim 5.

* * * * *